(12) United States Patent
Bower, III et al.

(10) Patent No.: US 8,793,526 B2
(45) Date of Patent: Jul. 29, 2014

(54) FIRMWARE MANAGEMENT IN A COMPUTING SYSTEM

(75) Inventors: Fred A. Bower, III, Durham, NC (US); Michael H. Nolterieke, Raleigh, NC (US); William G. Pagan, Durham, NC (US); Paul B. Tippett, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 13/280,828

(22) Filed: Oct. 25, 2011

(65) Prior Publication Data

US 2013/0103974 A1 Apr. 25, 2013

(51) Int. Cl.
*G06F 11/00* (2006.01)
(52) U.S. Cl.
USPC ............................................................. 714/1
(58) Field of Classification Search
USPC ............................................................. 714/1
See application file for complete search history.

(56) References Cited

U.S. PATENT DOCUMENTS

| | | | |
|---|---|---|---|
| 7,080,245 B2 | 7/2006 | Ballard et al. | |
| 7,340,595 B2 | 3/2008 | Blinick et al. | |
| 7,617,391 B2 | 11/2009 | Rawe et al. | |
| 8,294,918 B2 * | 10/2012 | Satoh et al. | 358/1.14 |
| 8,301,874 B1 * | 10/2012 | Heidingsfeld et al. | 713/2 |
| 8,316,123 B2 * | 11/2012 | Sethuraman et al. | 709/224 |
| 2002/0091919 A1 | 7/2002 | Goodman et al. | |
| 2004/0143828 A1 * | 7/2004 | Liu et al. | 717/168 |
| 2012/0173953 A1 * | 7/2012 | Flynn et al. | 714/758 |

* cited by examiner

*Primary Examiner* — Bryce Bonzo
(74) *Attorney, Agent, or Firm* — Edward J. Lenart; Katherine S. Brown; Biggers Kennedy Lenart Spraggins LLP

(57) ABSTRACT

Managing firmware in a computing system storing a plurality of different firmware images for the same firmware includes: calculating, for each firmware image in dependence upon a plurality of predefined factors, a preference score; responsive to a failure of a particular firmware image, selecting a firmware image having a highest preference score; and failing over to the selected firmware image.

19 Claims, 4 Drawing Sheets

FIRMWARE MANAGEMENT IN A COMPUTING SYSTEM

BACKGROUND OF THE INVENTION

1. Field of the Invention

The field of the invention is data processing, or, more specifically, methods, apparatus, and products for firmware management in a computing system.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Many computer systems today include the ability to store multiple versions of the same firmware—that is, multiple firmware images of the same firmware. Typically one firmware image is the most current version of the firmware available while another firmware image is older and known to be stable. In this way, the computing system utilizes the older, stable firmware version for failover. That is, when one firmware image fails, the computing system reverts to the firmware image known to be stable. Likewise, when the firmware is updated, the most current firmware image is replaced with the updated firmware image, while the older, stable firmware image is unchanged. When failover occurs then a stale, older version of the firmware is implemented. Although usually stable, many features and abilities may be missing from the older firmware image.

SUMMARY OF THE INVENTION

Methods, apparatus, and product for firmware management in a computing system are disclosed in this specification. The computing system stores a plurality of different firmware images for the same firmware. Firmware management in accordance with embodiments of the present invention includes: calculating, for each firmware image in dependence upon a plurality of predefined factors, a preference score; responsive to a failure of a particular firmware image, selecting a firmware image having a highest preference score; and failing over to the selected firmware image.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
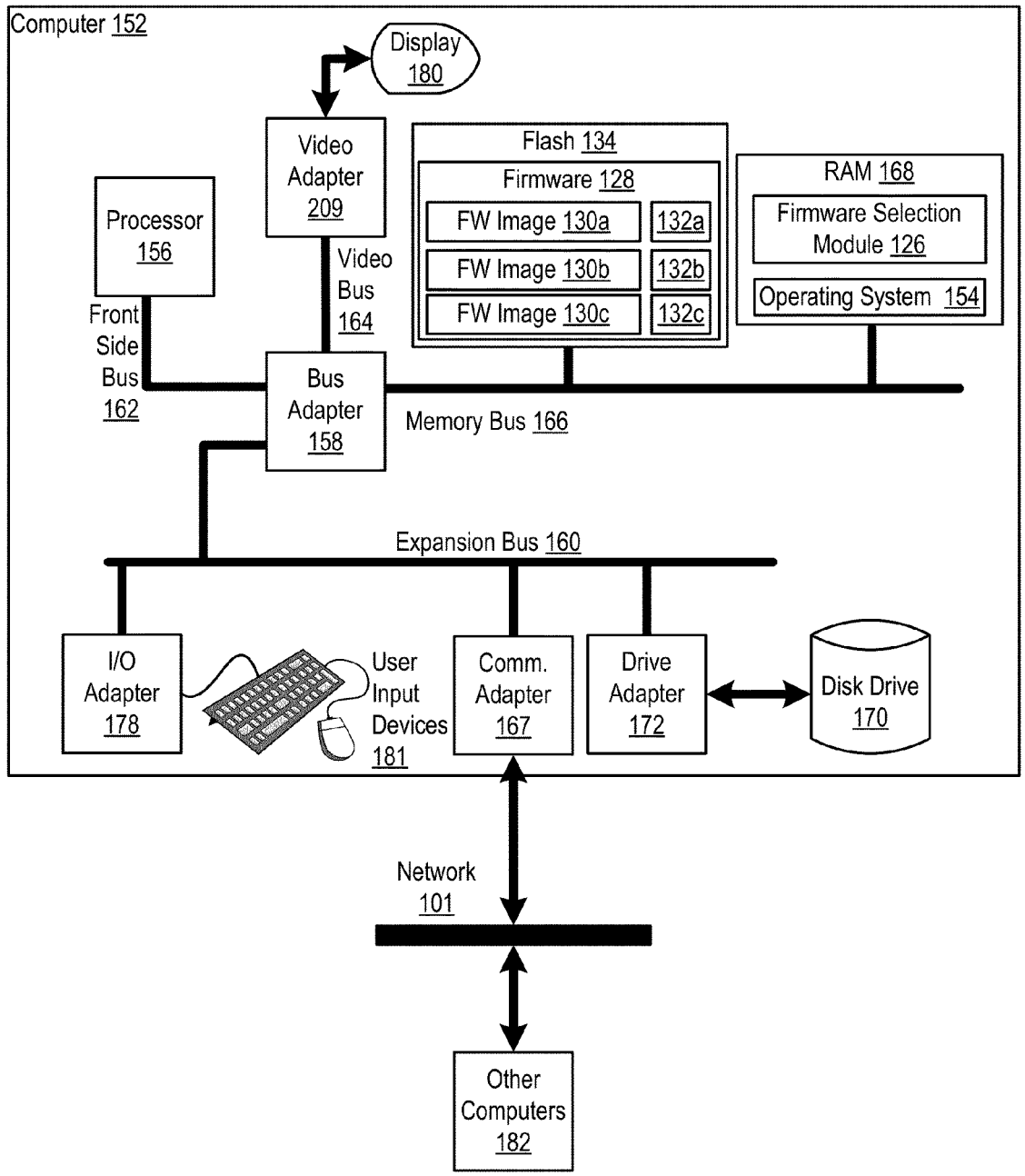
FIG. 1 sets forth a network diagram of a system for firmware management in a computing system according to embodiments of the present invention.

Exemplary methods, apparatus, and products for firmware management in a computing system in accordance with the present invention are described with reference to the accompanying drawings, beginning with FIG. 1. FIG. 1 sets forth a network diagram of a system for firmware management in a computing system according to embodiments of the present invention. The system of FIG. 1 includes a computing system—computer (152). The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152). The computer (152) also includes Non-volatile memory in the form of Flash memory (134).

Stored within Flash memory (134) is a plurality of different firmware images (130a-130c) for the same firmware (128). Although shown here stored in Flash (134), firmware capable of being managed in accordance with embodiments so the present invention may be stored in various memories within a computing system—within non-volatile or volatile memory and within any component of the computer (152), such as the communications adapter (167), disk drive adapter (172) or I/O adapter (178).

Stored in RAM (168) is a firmware selection module (126), a module of computer program instructions that manages firmware in accordance with embodiments of the present invention by: calculating, for each firmware image (130a-130c) in dependence upon a plurality of predefined factors, a preference score (132a-132c); responsive to a failure of a particular firmware image, selecting a firmware image having a highest preference score; and failing over to the selected firmware image.

In some embodiments the firmware selection module (126) may also operate to select, from the plurality of different firmware images (130a-130c), a firmware image having a lowest preference score (132a-132c) to replace with an updated firmware image and update the firmware. The firmware selection module (126) may update the firmware (128) by replacing the selected firmware image with the updated firmware image.

A preference score, as the term is used here, is a value representing the desirability of utilizing a firmware image—for failover or as a target for an update. The higher the value of a firmware image's preference score, the more likely the firmware image will be selected for failover. The lower the value of a firmware image's preference score the more likely the firmware image will be selected for updating. Although age of the firmware image may be a factor in calculating the preference score, age is not the sole factor. Many other factors may be considered in calculating the preference score including: a number of times the firmware image has failed; a frequency of firmware image failure; time the firmware image has been executing; features supported by the firmware image; and user-specified preferences. The firmware selection module (126) may maintain data describing these various factors.

Also stored in RAM (168) is an operating system (154). Operating systems useful firmware management in a computing system according to embodiments of the present invention include UNIX™, Linux™, Microsoft XP™, AIX™, IBM's i5/OS™, and others as will occur to those of skill in the art. The operating system (154) and the firmware selection module (126) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for firmware management in a computing system according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for firmware management in a computing system according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
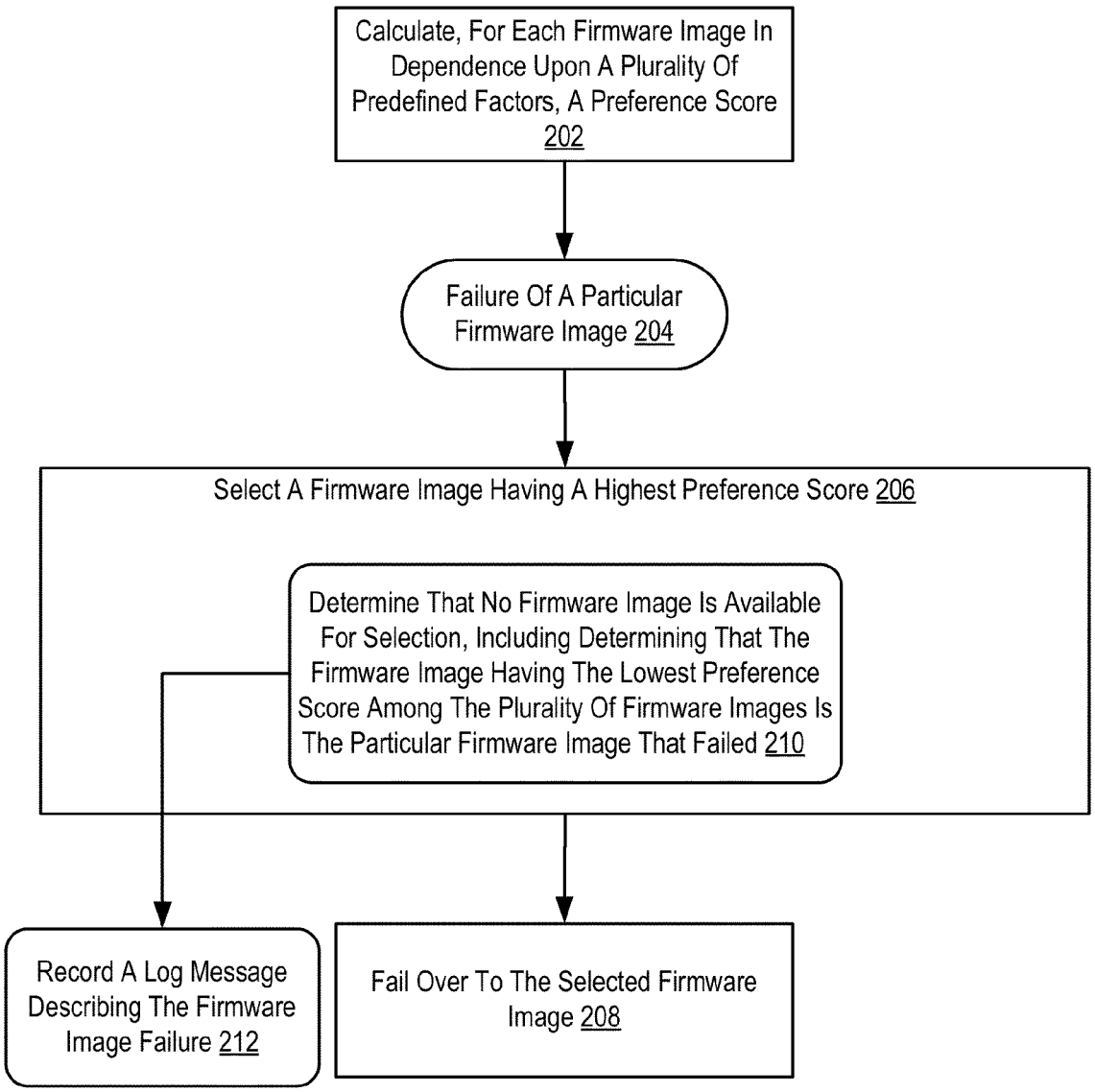
FIG. 2 sets forth a flow chart illustrating an exemplary method for firmware management in a computing system according to embodiments of the present invention.

For further explanation, FIG. 2 sets forth a flow chart illustrating an exemplary method for firmware management in a computing system according to embodiments of the present invention. In the method of FIG. 2, the computing system stores a plurality of different firmware images for the same firmware.

The method of FIG. 2 includes calculating (202), for each firmware image in dependence upon a plurality of predefined factors, a preference score (202). Calculating the preference score may be carried out in dependence upon one or more of: a number of times the firmware image has failed; a frequency of firmware image failure; age of the firmware image; time the firmware image has been executing; features supported by the firmware image; and user-specified preferences. Each factor may be assigned a value based on predefined criteria. For example, the older the firmware module the less the value. Once values are assigned to each factor based on the predefined criteria, the values may be summed to produce a single preference score. Readers of skill in the art will recognize that this is but one example way to calculate a preference score.

The method of FIG. 2 continues by experience a failure (204) of a particular firmware image. The particular firmware image is the image of firmware currently in use when the failure (204) occurred. Responsive to that failure, the method of FIG. 2 continues by selecting (206) a firmware image having a highest preference score and failing over (208) to the selected firmware image.

It may be possible that in some embodiments, no firmware images are available for selection. That is, the "particular firmware image" is the firmware image currently having the highest lowest preference score of all firmware images and all other firmware images have been previously selected, implemented, and failed. In such an embodiment, selecting (206) a firmware image in the method of FIG. 2 includes determining (210) that no firmware image is available for selection, including determining that the firmware image having the lowest preference score among the plurality of firmware images is the particular firmware image that failed and recording (212) a log message describing the firmware image failure.

Figure 3:
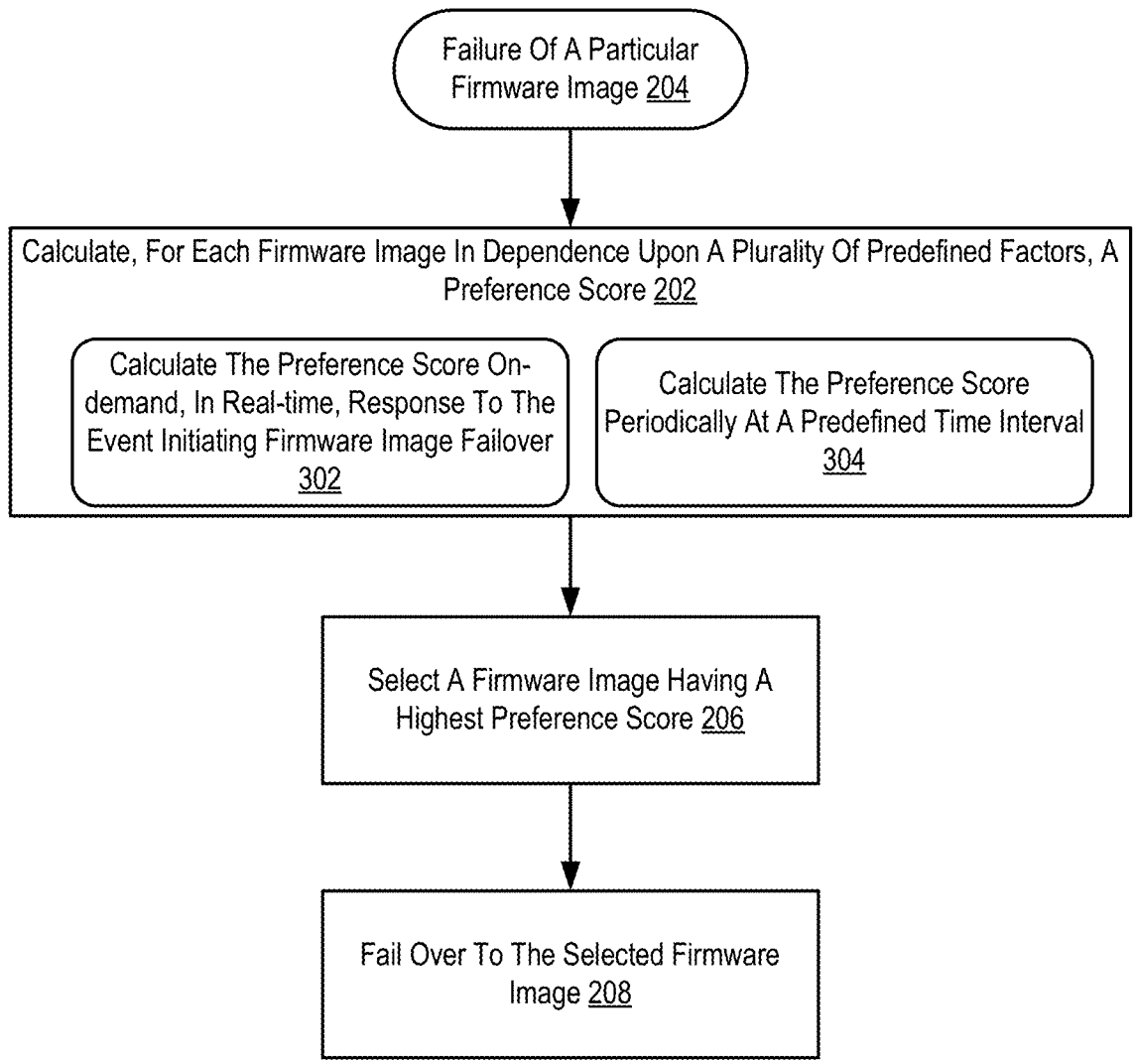
FIG. 3 sets forth a flow chart illustrating an exemplary method for firmware management in a computing system according to embodiments of the present invention.

For further explanation, FIG. 3 sets forth a flow chart illustrating an exemplary method for firmware management in a computing system according to embodiments of the present invention. The method of FIG. 3 is similar to the method of FIG. 2 including as it does calculating (202) a preference score, selecting (206) a firmware image having a highest preference score and failing over (208) to the selected firmware image.

The method of FIG. 3 differs from the method of FIG. 2, however, in that in the method of FIG. 3 calculating (202) a preference score may be carried out by calculating (302) the preference score on-demand, in real-time, response to the event (204) initiating firmware image failover or calculating (304) the preference score periodically at a predefined time interval. That is, the preference score may be calculated when needed, thereby preserving computation resources. In some embodiments, the preference score is kept up-to-date, calculating the score from time to time on a particular schedule, so that the score is readily available when needed and the failover process may be carried out quickly, without waiting for the score to be calculated. In some embodiments, a user of the computing system or the firmware vendor may specify which type of calculation is carried out.

Figure 4:
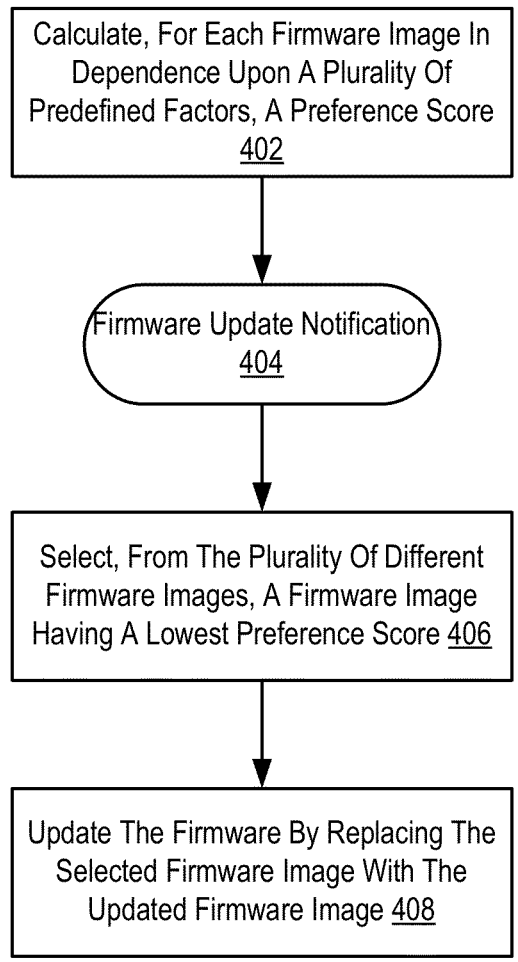
FIG. 4 sets forth a flow chart illustrating an exemplary method for firmware management in a computing system according to embodiments of the present invention.

For further explanation, FIG. 4 sets forth a flow chart illustrating an exemplary method for firmware management in a computing system according to embodiments of the present invention. In the method of FIG. 4, the computing system stores a plurality of different firmware images for the same firmware.

The method of FIG. 4 includes calculating (402), for each firmware image in dependence upon a plurality of predefined factors, a preference score. Such a calculation is similar to those calculations described above with respect to FIGS. 2 and 3.

The method of FIG. 4 continues by receiving a firmware update notification (404). Such a firmware update notification indicates a need to update the firmware to more current version. Such a notification may be issued by an operating system or another source.

Responsive to the firmware update notification (404), the method of FIG. 4 continues by selecting (406), from the plurality of different firmware images, a firmware image having a lowest preference score to replace with an updated firmware image and updating (408) the firmware by replacing the selected firmware image with the updated firmware image. Unlike firmware of the prior art in which the oldest firmware image is never updated, embodiments of the present invention may update the firmware image in most need of updating. Depending on the weight assigned to each factor in calculating the firmware image's preference score, the firmware image selected for update may be the newest firmware image, the oldest firmware image, or somewhere in between. The selected firmware image may be the least reliable, having failed many times—even though the firmware image is newer than other firmware images. The firmware image may have a low value assigned by a user preference. And so on. The preference score enables many factors to be considered when updating—as well as during failover as described above—firmware images.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of firmware management in a computing system, the computing system storing a plurality of different firmware images for the same firmware, the method comprising:
   calculating, for each firmware image in dependence upon a plurality of predefined factors, a preference score, including assigning, for each of the predefined factors, a value and summing the assigned values of the predefined factors, thereby generating the calculated preference score;
   responsive to a failure of a particular firmware image, selecting a firmware image having a highest preference score; and
   failing over to the selected firmware image.

2. The method of claim 1 further comprising:
   selecting, from the plurality of different firmware images, a firmware image having a lowest preference score to replace with an updated firmware image; and
   updating the firmware including replacing the selected firmware image with the updated firmware image.

3. The method of claim 1 wherein calculating a preference score further comprises calculating the preference score on-demand, in real-time, in response to the event initiating firmware image failover.

4. The method of claim 1 wherein calculating a preference score further comprises calculating the preference score periodically at a predefined time interval.

5. The method of claim 1 wherein calculating a preference score further comprises calculating the preference score in dependence upon one or more of:
   a number of times the firmware image has failed;
   a frequency of firmware image failure;
   age of the firmware image;
   time the firmware image has been executing;
   features supported by the firmware image; and
   user-specified preferences.

6. The method of claim 1 wherein selecting a firmware image having a highest preference score further comprises:
   determining that no firmware image is available for selection, including determining that the firmware image having the lowest preference score among the plurality of firmware images comprises the particular firmware image that failed; and
   recording a log message describing the firmware image failure.

7. An apparatus for firmware management in a computing system, the computing system storing a plurality of different firmware images for the same firmware, the apparatus comprising a computer processor, a computer memory operatively coupled to the computer processor, the computer memory having disposed within it computer program instructions capable of:
   calculating, for each firmware image in dependence upon a plurality of predefined factors, a preference score, including assigning, for each of the predefined factors, a value and summing the assigned values of the predefined factors, thereby generating the calculated preference score;
   responsive to a failure of a particular firmware image, selecting a firmware image having a highest preference score; and
   failing over to the selected firmware image.

8. The apparatus of claim 7 further comprising computer program instructions capable of:
   selecting, from the plurality of different firmware images, a firmware image having a lowest preference score to replace with an updated firmware image; and
   updating the firmware including replacing the selected firmware image with the updated firmware image.

9. The apparatus of claim 7 wherein calculating a preference score further comprises calculating the preference score on-demand, in real-time, in response to the event initiating firmware image failover.

10. The apparatus of claim 7 wherein calculating a preference score further comprises calculating the preference score periodically at a predefined time interval.

11. The apparatus of claim 7 wherein calculating a preference score further comprises calculating the preference score in dependence upon one or more of:
   a number of times the firmware image has failed;
   a frequency of firmware image failure;
   age of the firmware image;
   time the firmware image has been executing;
   features supported by the firmware image; and
   user-specified preferences.

12. The apparatus of claim 7 wherein selecting a firmware image having a highest preference score further comprises:
   determining that no firmware image is available for selection, including determining that the firmware image having the lowest preference score among the plurality of firmware images comprises the particular firmware image that failed; and
   recording a log message describing the firmware image failure.

13. A computer program product for firmware management in a computing system, the computing system storing a plurality of different firmware images for the same firmware, the computer program product disposed upon a computer readable storage medium, the computer program product comprising computer program instructions capable, when executed, of causing a computer to carry out the steps of:
   calculating, for each firmware image in dependence upon a plurality of predefined factors, a preference score, including assigning, for each of the predefined factors, a value and summing the assigned values of the predefined factors, thereby generating the calculated preference score;

responsive to a failure of a particular firmware image, selecting a firmware image having a highest preference score; and failing over to the selected firmware image.

14. The computer program product of claim 13 further comprising computer program instructions capable, when executed, of causing the computer to carry out the steps of:

selecting, from the plurality of different firmware images, a firmware image having a lowest preference score to replace with an updated firmware image; and updating the firmware including replacing the selected firmware image with the updated firmware image.

15. The computer program product of claim 13 wherein calculating a preference score further comprises calculating the preference score on-demand, in real-time, in response to the event initiating firmware image failover.

16. The computer program product of claim 13 wherein calculating a preference score further comprises calculating the preference score periodically at a predefined time interval.

17. The computer program product of claim 13 wherein calculating a preference score further comprises calculating the preference score in dependence upon one or more of:

a number of times the firmware image has failed;
a frequency of firmware image failure;
age of the firmware image;
time the firmware image has been executing;
features supported by the firmware image; and
user-specified preferences.

18. The computer program product of claim 13 wherein selecting a firmware image having a highest preference score further comprises:

determining that no firmware image is available for selection, including determining that the firmware image having the lowest preference score among the plurality of firmware images comprises the particular firmware image that failed; and recording a log message describing the firmware image failure.

19. A method of firmware management in a computing system, the computing system storing a plurality of different firmware images for the same firmware, the method comprising:

calculating, for each firmware image in dependence upon a plurality of predefined factors, a preference score, including assigning, for each of the predefined factors, a value and summing the assigned values of the predefined factors, thereby generating the calculated preference score;

selecting, from the plurality of different firmware images, a firmware image having a lowest preference score to replace with an updated firmware image; and updating the firmware including replacing the selected firmware image with the updated firmware image.

* * * * *